United States Patent [19]

Conrad

[11] 4,406,522
[45] Sep. 27, 1983

[54] VARIABLE MAGNIFICATION LENS

[75] Inventor: Lawrence H. Conrad, N. Syracuse, N.Y.

[73] Assignee: Minnesota Mining & Manufacturing Company, St. Paul, Minn.

[21] Appl. No.: 249,986

[22] Filed: Apr. 1, 1981

Related U.S. Application Data

[63] Continuation-in-part of Ser. No. 183,315, Sep. 2, 1980, abandoned.

[51] Int. Cl.³ .......................... G02B 9/64; G02B 15/16
[52] U.S. Cl. ..................................... 350/425; 350/450; 350/463
[58] Field of Search ................ 350/425, 423, 450, 463

[56] References Cited

U.S. PATENT DOCUMENTS

| | | |
|---|---|---|
| 2,481,639 | 9/1949 | Altman et al. .................. 350/463 |
| 3,728,010 | 4/1973 | Mikami . |
| 3,771,853 | 11/1973 | Nakamura . |
| 3,788,731 | 1/1974 | Sugiura et al. . |
| 4,037,937 | 7/1977 | Minoura . |
| 4,099,846 | 7/1978 | Kawamura et al. . |
| 4,149,774 | 4/1979 | Hirano et al. ................. 350/425 |
| 4,153,339 | 5/1979 | Tajima et al. . |
| 4,168,110 | 9/1979 | Itoh . |

Primary Examiner—John K. Corbin
Assistant Examiner—Rebecca D. Gass
Attorney, Agent, or Firm—Cruzan Alexander; Donald M. Sell; John C. Barnes

[57] ABSTRACT

A variable magnification optical system comprising two lens components one on each side of an aperture stop with a positive lens element in each component connected for simultaneous movement to afford a change of 14.5× to 16.2× magnification in an object to image distance of 1108.96 mm.

3 Claims, 13 Drawing Figures

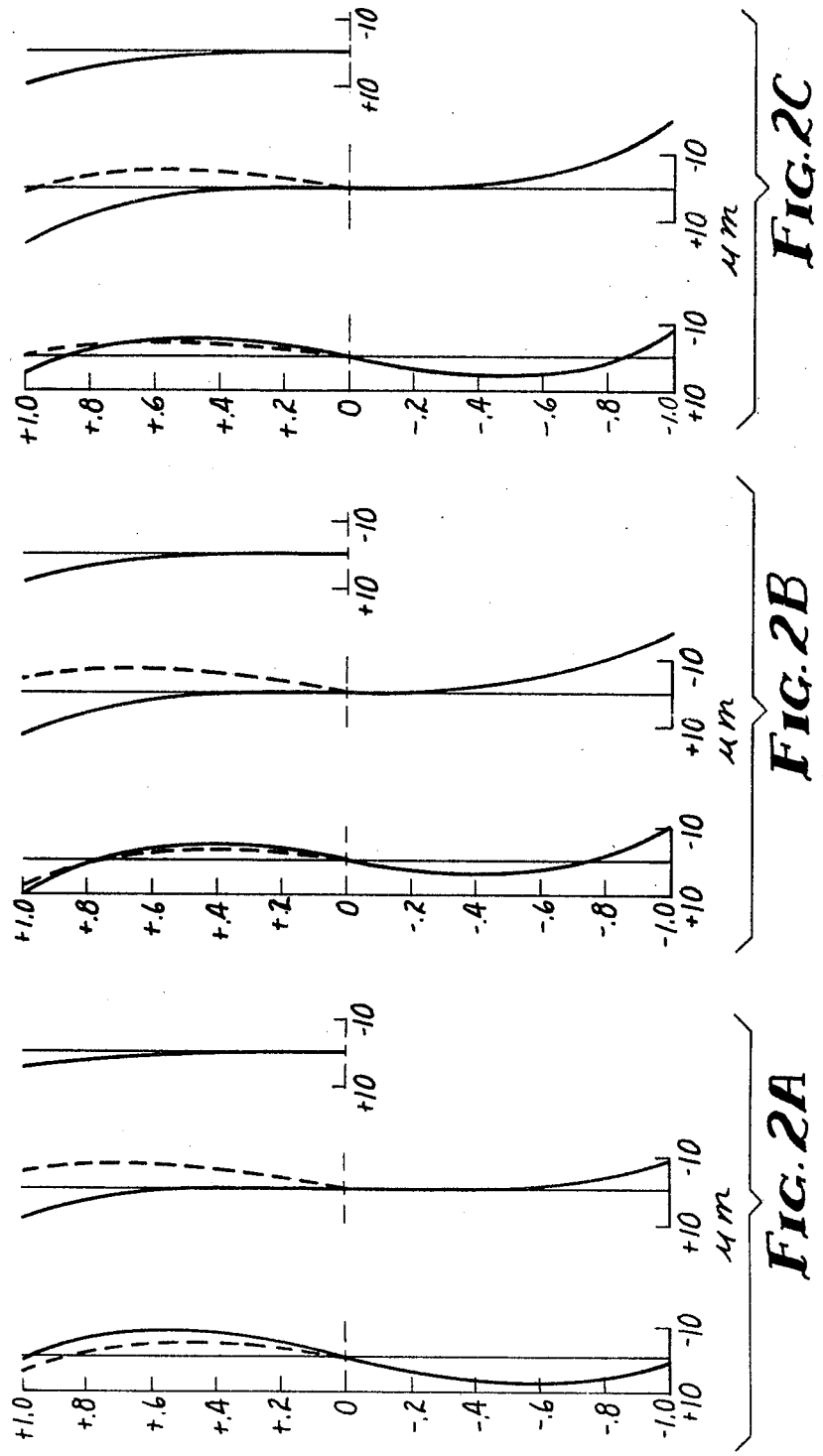

VARIABLE MAGNIFICATION LENS

RELATED APPLICATIONS

This application is a continuation-in-part of application Ser. No. 183,315, filed Sept. 2, 1980, now abandoned.

DESCRIPTION

1. Technical Field

This invention relates to variable magnification optical systems, and more particularly to a lens having a 22 degree half-angle and extremely high resolution, wherein there is very little element movement required to vary the magnification, and in the present system the front lens component has a movable positive lens component and the rear lens component has a positive movable lens component. The two movable components move synchronously.

2. Background Art

The prior art possesses variable magnification lenses having a somewhat symmetrical lens system but it is not seen that the prior art contains a variable magnification lens having a 14.5X to 16.2X magnification range which is useful in a microfilm reader/printer apparatus for reproduction of images to the exact size of the original images. The particular apparatus for which the lens of the present invention is designed is a microfilm printer or reader wherein the 35 mm (D-size) microfilm image is to be projected. Thus a lens having a wide angle on the object side is very useful with a short object to image distance. Further, the lens system of the present invention uses only spherical lens surfaces, making the manufacture of the same relatively easy.

The prior art 10 element systems which are known to applicant are illustrated in U.S. Pat. Nos. 3,728,010; 3,771,853; 3,788,731; 4,099,846; 4,153,339; and 4,168,110. These patents fail however to teach a zoom lens where there is short interior movement of relatively few lens elements, and the elements are compact and provide a wide angle view.

DISCLOSURE OF INVENTION

The variable magnification lens of the present invention is a 10-element lens for providing magnification between 14.5X and 6.2X with a back focal distance of between 22.97 to 27.2 mm, a vertex to vertex distance of 89.99 mm. A single lens element in the first lens group is movable together with a single lens element in the second lens group with both of the movable lenses having a positive diffractive power. Total movement of the elements is 6 mm along the axis. The diameter of the largest lens element is 47.0 mm, affording thereby a very compact variable magnification lens.

DESCRIPTION OF DRAWINGS

FIGS. 2A, 2B and 2C are graphic representations of the aberrations of the objective of FIG. 1 when set in the wide angle, the medium position, and telephoto positions respectively, showing the tangential and sagittal rays for full field, 70.7% field, and on axis in each position;

BEST MODE OF CARRYING OUT THE INVENTION

Figure 1:
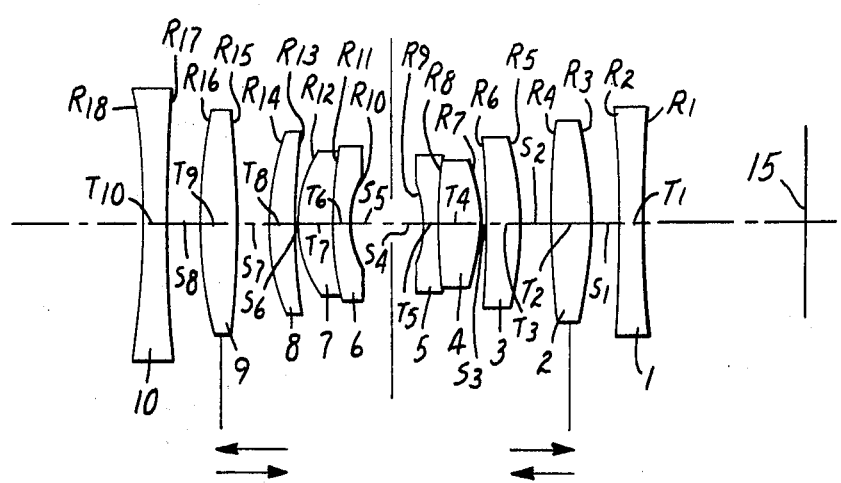
FIG. 1 provides a schematic diagram of the components of the variable magnification lens of the present invention.

The present invention provides a novel variable magnification lens which is useful in the microfilm machine for projecting an image back onto a screen or back onto a photosensitive medium for making prints or reproductions of the original image to the exact same size, and provides for magnification of between 14.5X and 16.2X. In affording this magnification only small movements of the elements are required, i.e. only 6 mm, as will hereinafter be described, and the lens provides a large 22.1 degree half-angle coverage with very high microimagery resolution of between 96 lines per millimeter at the edge of the lens and 144 lines per millimeter on axis.

The lens system comprises a first lens component of 5 lenses positioned adjacent the film plane of 51 mm in diameter and comprising a first negative lens 1 having a diameter of 39.5 mm, air spaced from a movable positive lens element 2, a third lens element 3 of positive focus; a fourth element 4; and a fifth element 5 forming a positive doublet air spaced from the aperture stop by a distance of 9.13 mm.

The second lens component consists of 5 lens elements, elements 6 and 7 for forming a positive lens doublet and spaced 6.94 mm from the aperture stop, element 8 is a positive meniscus lens, element 9 is a positive lens which is movable synchronously with lens element 2 and in opposite directions, and the rear lens element 10 being a negative lens.

The object to image distance is 43.66 inches (1108.96 mm) and the back focal distance is 22.97 to 27.2 mm. The film plane 15 has a diameter of 51 mm.

A specific example of the variable magnification lens of the present invention is described in the following table in which the radii of curvature of the refracting surfaces are denoted by the capital R and the subscript and are given in millimeters, the axial air separations (S) or thicknesses of the lenses (T) are given in consecutive order from front to rear in millimeters (the front being the end of the lens the light enters), the refractive indices for the d-line and the Abbe dispersion numbers are respectively designated in the columns headed $N_d$ and V. The subscripts for the radii of curvature of the refracting surfaces are numbered by subscripts in order from the front to the rear.

| | | First lens group | | |
|---|---|---|---|---|
| | $N_d$ | $V_d$ | R(mm) | T & S(mm) |
| 1 | 1.511 | 59.8 | $R_1 = -174.20$ | $T_1 = 4.0$ |
| | | | $R_2 = +271.05$ | |

-continued

First lens group

| | $N_d$ | $V_d$ | R(mm) | T & S(mm) |
|---|---|---|---|---|
| | | | | $S_1 = 3$ to $9$ |
| | | | $R_3 = +86.004$ | |
| 2 | 1.511 | 59.8 | | $T_2 = 6.5$ |
| | | | $R_4 = -188.70$ | |
| | | | | $S_2 = 9$ to $3$ |
| | | | $R_5 = +57.730$ | |
| 3 | 1.719 | 42.08 | | $T_3 = 6.5$ |
| | | | $R_6 = +537.113$ | |
| | | | | $S_3 = 0.7$ |
| | | | $R_7 = +31.501$ | |
| 4 | 1.658 | 57.33 | | $T_4 = 7.51$ |
| | | | $R_8 = -97.481$ | |
| 5 | 1.636 | 35.37 | | $T_5 = 2.84$ |
| | | | $R_9 = +22.15$ | |

A 6.84 mm diameter aperture stop is placed 6.13 mm from element 5 and 6.94 mm from the second or rear lens group.

The second lens group is spaced from the aperture stop and consists of five spherical lens elements, numbered consecutively 6 through 10, described in the following table.

| | $N_d$ | $V_d$ | R(mm) | T & S(mm) |
|---|---|---|---|---|
| | | | $R_{10} = -15.474$ | |
| 6 | 1.647 | 33.8 | | $T_6 = 3.11$ |
| | | | $R_{11} = -52.317$ | |
| 7 | 1.691 | 54.8 | | $T_7 = 6.06$ |
| | | | $R_{12} = -23.25$ | |
| | | | | $S_6 = 0.5$ |
| | | | $R_{13} = -96.513$ | |
| 8 | 1.670 | 47.25 | | $T_8 = 4.7$ |
| | | | $R_{14} = -44.524$ | |
| | | | | $S_7 = 9$ to $3$ |
| | | | $R_{15} = +188.70$ | |
| 9 | 1.511 | 59.8 | | $T_9 = 6.5$ |
| | | | $R_{16} = -86.004$ | |
| | | | | $S_8 = 3$ to $9$ |
| | | | $R_{17} = -217.05$ | |
| 10 | 1.511 | 59.8 | | $T_{10} = 4.0$ |
| | | | $R_{18} = +174.20$ | |

The following table provides a ready reference for determining the positions of the lens elements 2 and 9 for the various air spacings $S_1$, $S_2$, $S_7$, and $S_8$ to accomplish the wide angle, medium and telephoto positions of the lenses.

TABLE

| | $S_1$ | $S_2$ | $S_7$ | $S_8$ |
|---|---|---|---|---|
| 16.2X | 9.0 | 3.0 | 3.0 | 9.0 |
| 15.3X | 6.0 | 6.0 | 6.0 | 6.0 |
| 14.5X | 3.0 | 9.0 | 9.0 | 3.0 |

The distortion of the lens at 100% or full field is 0.8% at the wide angle position, 16.2X magnification; 0.2% at a medium position of 15.35X and 0.3% at the telephoto position of 14.5X magnification.

FIGS. 2A, 2B and 2C show the state of correction for aberrations. These figures show the sagittal and tangential rays, plotted by broken and solid lines respectively, for each of the respective positions of wide angle, 16.2X, the medium position, 15.35X and the telephoto position, 14.5X, respectively. In each figure the rays are shown at full field, 70.7% of field and on axis from left to right.

The graphs on FIGS. 2A, 2B, and 2C indicate that there is no vignetting as the lens is zoomed from the telephoto position to the wide angle position.

Figure 3A:
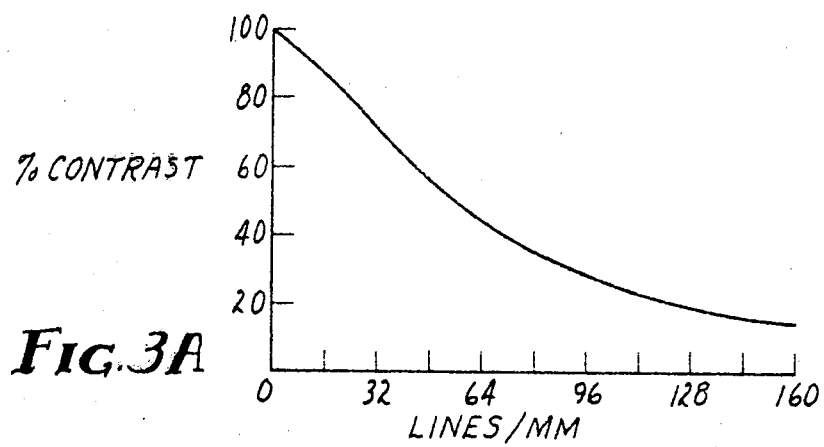
FIGS. 3A, 3B and 3C are diagrams plotting the percent of contrast against the lines per millimeter for the tangential and sagittal rays for the wide angle, the medium position and telephoto positions respectively of the lens on axis, focussed at −0.030 mm; −0.020 mm; and −0.020 mm respectively.
Figure 3B:
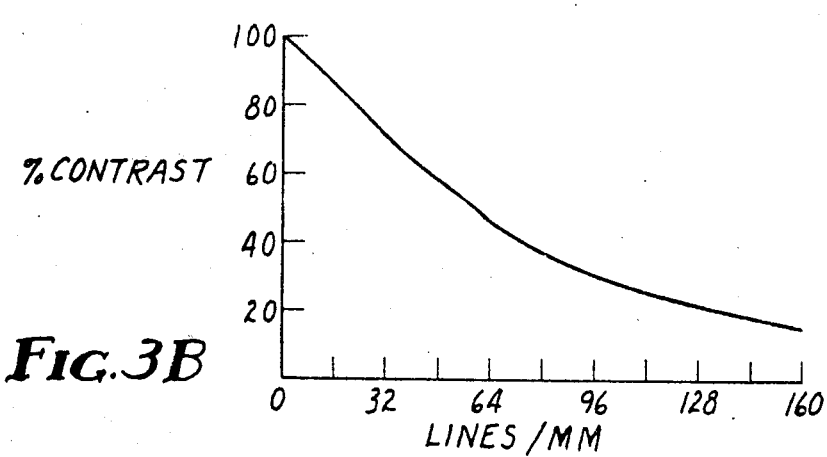
Figure 3C:
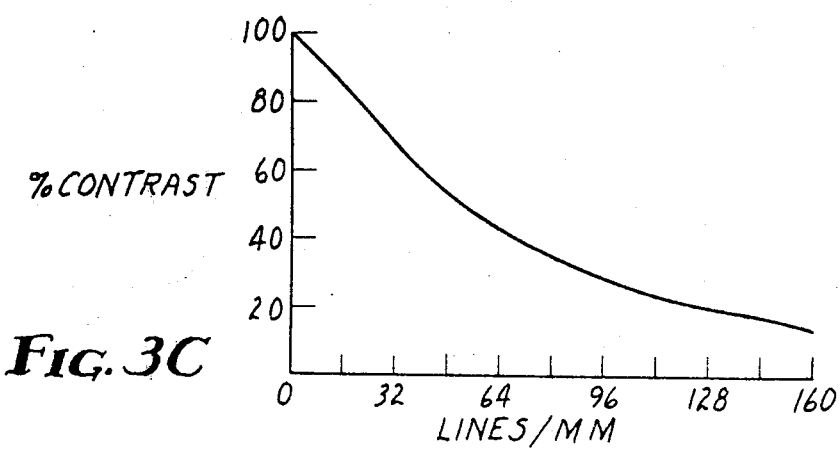

FIGS. 3A, 3B and 3C are graphs showing the percent of contrast of the image plotted against the lines per millimeter for the lens in the wide angle, FIG. 3A, medium position, FIG. 3B, and telephoto position, FIG. 3C, and with slight focus shift of −0.30 mm, −0.20 mm and −0.20 mm respectively, the contrast as shown on axis remains very constant.

Figure 4A:
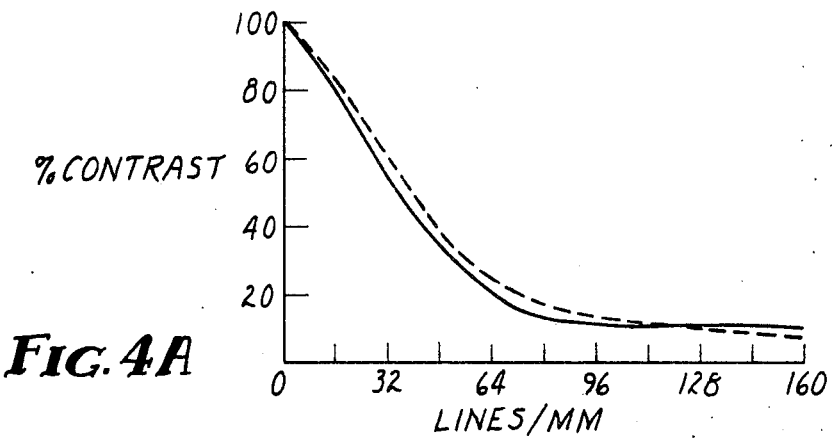
FIGS. 4A, 4B and 4C are diagrams of the contrast plotted against the lines per millimeter of the objective of FIG. 1 for 70.7% of the field at the wide angle position, the medium position, and the telephoto position respectively, and focussed at −0.030 mm; −0.020 mm; and −0.020 mm respectively.
Figure 4B:
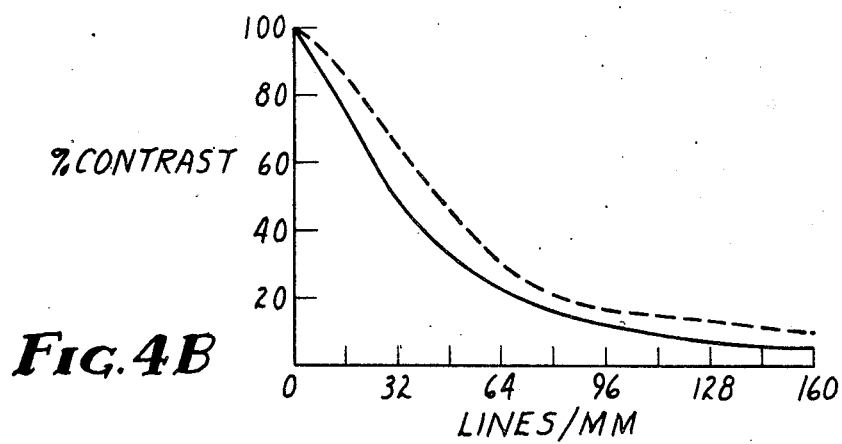
Figure 4C:
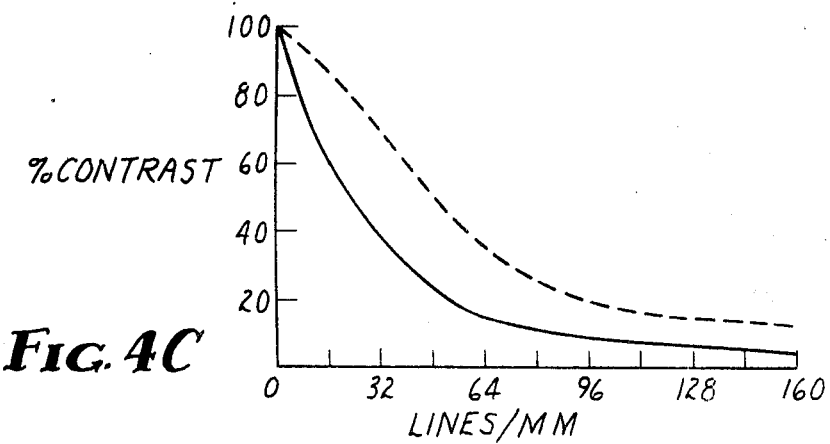

In viewing FIGS. 4A, 4B, and 4C the plot of the tangential ray, the solid line, and the sagittal ray, the broken line, indicate the percent of contrast for a given value of lines per millimeter at 70.7 percent of the field and again the lens has uniformity and good contrast upon movement between the wide angle, medium, and telephoto positions, FIGS. 4A, 4B and 4C respectively.

Figure 5A:
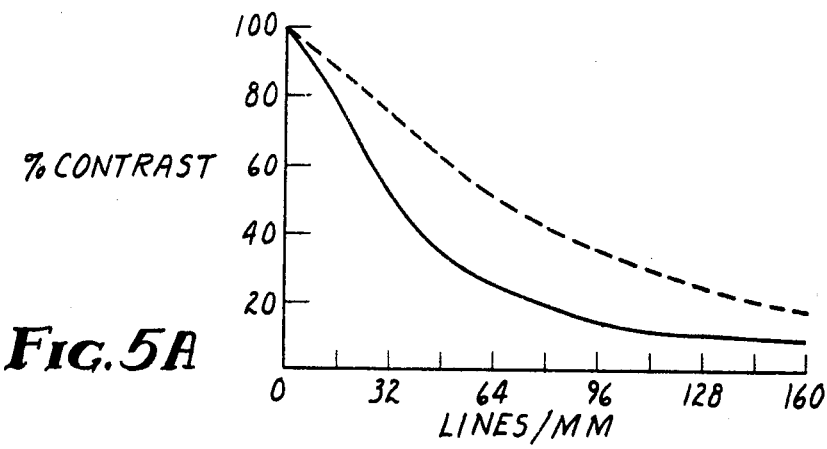
FIGS. 5A, 5B and 5C are diagrams of the percent of contrast plotted against lines per millimeter for the tangential and sagittal rays through the objective of FIG. 1 at full field for the wide angle, medium position and telephoto position respectively, and focussed at −0.030; −0.020 mm; and −0.020 mm respectively.
Figure 5B:
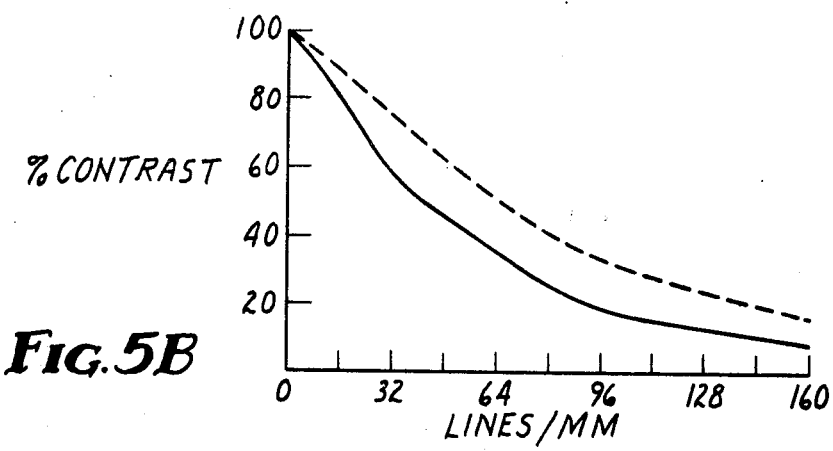
Figure 5C:
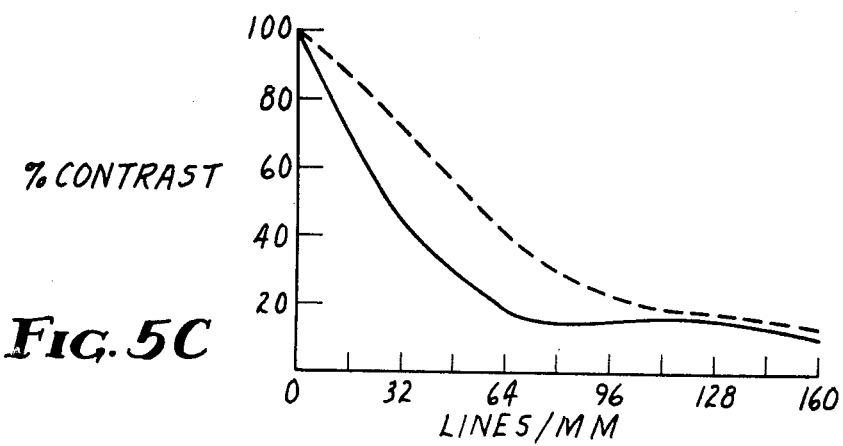

FIGS. 5A, 5B and 5C again plot the tangential ray, solid line, against the sagittal ray, the broken line, at full field in the wide angle, medium, and telephoto positions respectively. Again there is a uniformity of contrast in each position.

Having disclosed the preferred embodiment of the present invention it will be understood that slight modifications can be made in the structure described without departing from the present invention as stated in the appended claims.

I claim:

1. A variable magnification lens comprising a first lens component having a plurality of spherical lens elements including a negative lens element as the first element and a positive lens element as the second element, and a second lens component having a plurality of spherical lens elements, the penultimate lens element being a positive lens and the last element being a negative lens element, said negative lens elements and said positive lens elements being identical, means coupling said positive lens elements for simultaneous limited opposed movement to maintain spatial symmetry of the positive lens elements in relationship to said negative lens elements and to afford a magnification change of 1.7X in the lens, and an aperture stop being fixed between said lens components, said negative lens elements being fixed in relationship to said aperture stop.

2. A variable magnification lens according to claim 1 wherein the movement of the positive lens elements is 6 mm and an image to object distance is 1108.96 mm.

3. A variable magnification lens comprising a first lens component having a plurality of spherical lens elements including a positive lens element as the second element and a second lens component having a plurality of spherical lens elements, the penultimate lens element being a positive lens, said positive lens elements being coupled for simultaneous limited opposed movement to afford a magnification change of 1.7× in the lens and an aperture stop between said lens components, the lens elements for the two components have substantially the following characteristics

| | $N_d$ | $V_d$ | R(mm) | T & S(mm) |
|---|---|---|---|---|
| | | | $R_1 = -174.20$ | |
| 1 | 1.511 | 59.8 | | $T_1 = 4.0$ |
| | | | $R_2 = +271.05$ | |
| | | | | $S_1 = 3$ to $9$ |
| | | | $R_3 = +86.004$ | |
| 2 | 1.511 | 59.8 | | $T_2 = 6.5$ |
| | | | $R_4 = -188.70$ | |
| | | | | $S_2 = 9$ to $3$ |

|   | $N_d$ | $V_d$ | R(mm) | T & S(mm) |
|---|---|---|---|---|
|   |   |   | $R_5 = +57.730$ |   |
| 3 | 1.719 | 42.08 |   | $T_3 = 6.5$ |
|   |   |   | $R_6 = +537.113$ |   |
|   |   |   |   | $S_3 = 0.7$ |
|   |   |   | $R_7 = +31.501$ |   |
| 4 | 1.658 | 57.33 |   | $T_4 = 7.51$ |
|   |   |   | $R_8 = -97.481$ |   |
| 5 | 1.636 | 35.37 |   | $T_5 = 2.84$ |
|   |   |   | $R_9 = +22.15$ |   |
|   |   |   |   | $S_4 = 13.07$ |
|   |   |   | $R_{10} = -15.474$ |   |
| 6 | 1.647 | 33.8 |   | $T_6 = 3.11$ |
|   |   |   | $R_{11} = -52.317$ |   |
| 7 | 1.691 | 54.8 |   | $T_7 = 6.06$ |
|   |   |   | $R_{12} = -23.25$ |   |
|   |   |   |   | $S_6 = 0.5$ |
|   |   |   | $R_{13} = -96.513$ |   |
| 8 | 1.670 | 47.25 |   | $T_8 = 4.7$ |
|   |   |   | $R_{14} = -44.524$ |   |
|   |   |   |   | $S_7 = 9$ to 3 |
|   |   |   | $R_{15} = +188.70$ |   |
| 9 | 1.511 | 59.8 |   | $T_9 = 6.5$ |
|   |   |   | $R_{16} = -86.004$ |   |
|   |   |   |   | $S_8 = 3$ to 9 |
|   |   |   | $R_{17} = -217.05$ |   |
| 10 | 1.511 | 59.8 |   | $T_{10} = 4.0$ |
|   |   |   | $R_{18} = +174.20$ |   | wherein the lens elements are numbered consecutively from image to object, the radii of curvature of the refracting surfaces are denoted by R with a subscript and are given in mm, the S means air separations in mm, the T means thickness of lens elements in mm and the refractive indices are given for the d-line of sodium ($N_d$) and the Abbe dispersion indices are designated ($v_d$).

* * * * *

UNITED STATES PATENT AND TRADEMARK OFFICE
CERTIFICATE OF CORRECTION

PATENT NO. : 4,406,522
DATED : September 27, 1983
INVENTOR(S) : Lawrence H. Conrad It is certified that error appears in the above—identified patent and that said Letters Patent is hereby corrected as shown below:

Col. 1, line 46, change "6.2X" to -- 16.2X --.

Signed and Sealed this

Eleventh Day of September 1984

[SEAL]

Attest:

GERALD J. MOSSINGHOFF

Attesting Officer

Commissioner of Patents and Trademarks